United States Patent
Winzer et al.

(10) Patent No.: US 9,899,792 B1
(45) Date of Patent: Feb. 20, 2018

(54) EFFICIENT PUMPING OF AN ARRAY OF OPTICAL AMPLIFIERS

(71) Applicant: Alcatel-Lucent USA Inc., Murray Hill, NJ (US)

(72) Inventors: Peter J. Winzer, Aberdeen, NJ (US); Alan H. Gnauck, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/241,650

(22) Filed: Aug. 19, 2016

(51) Int. Cl.
*H01S 3/067* (2006.01)
*H01S 3/091* (2006.01)
*H01S 3/23* (2006.01)

(52) U.S. Cl.
CPC .......... *H01S 3/06758* (2013.01); *H01S 3/091* (2013.01); *H01S 3/2316* (2013.01)

(58) Field of Classification Search
CPC .... H01S 3/06758; H01S 3/091; H01S 3/2308; H01S 3/2316
See application file for complete search history.

(56) References Cited

U.S. PATENT DOCUMENTS

| | | | |
|---|---|---|---|
| 5,430,572 A * | 7/1995 | DiGiovanni | H01S 3/06758 359/337 |
| 5,504,771 A | 4/1996 | Vahala et al. | |
| 6,473,223 B1 | 10/2002 | Masum-Thomas | |
| 6,525,869 B1 | 2/2003 | Thomas et al. | |
| 6,583,925 B1 * | 6/2003 | Delavaux | H01S 3/06754 359/341.32 |
| 7,599,406 B2 | 10/2009 | Chi et al. | |
| 8,089,690 B2 * | 1/2012 | Rapp | H04B 10/291 359/341.3 |
| 8,941,911 B2 | 1/2015 | Liu et al. | |

(Continued)

OTHER PUBLICATIONS

Liaw, Shien-Kuei, et al., "Dispersion Management and Gain Flattened for a Bridge-Type Hybrid Amplifiers in a Pumping Recycling Mechanism," International Congress on Ultra Modern Telecommunications and Control Systems and Workshops (ICUMT), 2010, pp. 1180-1182.

(Continued)

*Primary Examiner* — Eric Bolda
(74) *Attorney, Agent, or Firm* — Mendelsohn Dunleavy, P.C.; Yuri Gruzdkov

(57) ABSTRACT

An array of optical amplifiers that recycles the unused pump power of some or all constituent amplifiers thereof, thereby beneficially improving pump-power utilization therein compared to that of conventional optical amplifiers. In an example embodiment, different amplifiers of the array can be configured to receive approximately equal pump power and be used to independently amplify different respective optical signals. In various embodiments, the unused pump power can be recycled using one or more optical couplers and/or optical paths that appropriately interconnect different amplifiers of the array. Some embodiments have one or more optical loops configured to operate as a ring laser that regenerates pump light in response to the unused pump power being coupled thereto. Some embodiments provide a spectral gain profile suitable for amplifying WDM signals in at least some of the constituent amplifiers of the array.

19 Claims, 5 Drawing Sheets

(56) References Cited

U.S. PATENT DOCUMENTS 9,019,998 B1     4/2015   Qureshi
2008/0204860 A1*   8/2008   Rapp .................... H04B 10/291
                                                                                            359/341.3

OTHER PUBLICATIONS

"Silica-on-Silicon Optical Couplers and Coupler Based Optical Filters," www.orbit.dtu.dk, 2002 [retrieved on Jun. 27, 2016] Retrieved from the Internet: <URL: http://orbit.dtu.dk/files/3006703/Lasse_Leick_PHD170702.pdf> (197 pages).

* cited by examiner

100

200

300

400

800

900

EFFICIENT PUMPING OF AN ARRAY OF OPTICAL AMPLIFIERS

BACKGROUND

Field

The present disclosure relates to optical amplifiers.

Description of the Related Art

This section introduces aspects that may help facilitate a better understanding of the disclosure. Accordingly, the statements of this section are to be read in this light and are not to be understood as admissions about what is in the prior art or what is not in the prior art.

An optical amplifier is a device that amplifies an optical signal directly in the optical domain without converting the optical signal into a corresponding electrical signal. Optical amplifiers are widely used, for example, in the fields of optical communications and laser physics.

One type of an optical amplifier is a doped-fiber amplifier, with a well-known example being the Erbium-doped fiber amplifier (EDFA). In operation, a signal to be amplified and an optical pump beam are applied to the doped fiber. The optical pump beam excites the doping ions, and amplification of the optical signal is achieved by stimulated emission of photons from the excited dopant ions.

Another type of an optical amplifier is a Raman amplifier, which relies on stimulated Raman scattering (SRS) for signal amplification. More specifically, when an optical signal to be amplified and an optical pump beam are applied to a fiber made of a suitable material, a lower-frequency signal photon induces SRS of a higher-frequency pump photon, which causes the pump photon to pass some of its energy to the vibrational states of the fiber material thereby converting the pump photon into an additional signal photon.

SUMMARY OF SOME SPECIFIC EMBODIMENTS

Disclosed herein are various embodiments of an array of optical amplifiers that recycles the unused pump power of some or all constituent amplifiers thereof, thereby beneficially improving pump-power utilization therein compared to that of conventional optical amplifiers. In an example embodiment, different amplifiers of the array can be configured to receive approximately equal pump power and be used to independently amplify different respective optical signals. In various embodiments, the unused pump power can be recycled using one or more optical couplers and/or optical paths that appropriately interconnect different amplifiers of the array. Some embodiments have one or more optical loops configured to operate as a ring laser that regenerates pump light in response to the unused pump power being coupled thereto. Some embodiments provide a spectral gain profile suitable for amplifying WDM signals in at least some of the constituent amplifiers of the array.

According to one embodiment, provided is an apparatus comprising: a plurality of optical amplifiers, each configured to: amplify a respective optical signal in response to receiving pump light at a respective input pump port thereof; and output a respective unused portion of the pump light through a respective output pump port thereof; and a set of one or more optical couplers that connect the plurality of optical amplifiers in a series. Each optical coupler of the set is connected between a respective preceding optical amplifier of the series and a respective next optical amplifier of the series and is configured to: split the respective unused portion of the pump light that exits the respective output pump port of the preceding optical amplifier into a respective first light beam and a respective second light beam; apply the respective first light beam to the respective input pump port of the respective next optical amplifier; and direct the respective second light beam to bypass the respective next optical amplifier.

According to another embodiment, provided is an apparatus comprising: an optical coupler having first and second input ports and first and second output ports; a first optical amplifier having an input pump port and an output pump port, the input pump port of the first optical amplifier connected to receive pump light from the first output port of the optical coupler, and the output pump port of the first optical amplifier connected to apply an unused portion of the pump light to the first input port of the optical coupler; and a second optical amplifier having an input pump port connected to receive pump light from the second output port of the optical coupler.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
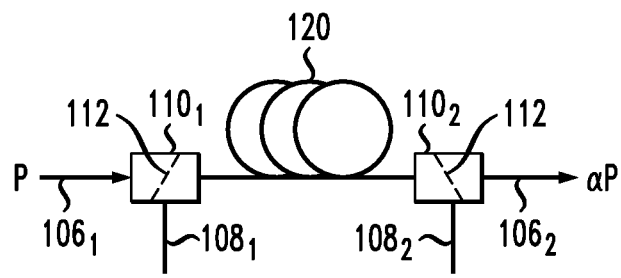
FIG. 1 shows a block diagram of an optical amplifier that can be used in various embodiments.

FIG. 1 shows a block diagram of an optical amplifier 100 that can be used in various embodiments. Optical amplifier 100 is a four-port device that includes an optical gain medium 120 operatively connected between optical couplers $110_1$ and $110_2$ as indicated in FIG. 1. In an example embodiment, optical gain medium 120 comprises a length of optical fiber made of an appropriate material that causes optical-signal amplification therein in response to receiving optical pump power. Depending on the particular embodiment, optical-signal amplification in optical gain medium 120 can occur via stimulated emission or stimulated Raman scattering (SRS).

Optical coupler $110_1$ is a 2×1 coupler that has an optical pump port $106_1$ and an optical signal port $108_1$. Optical coupler $110_2$ is a 1×2 coupler that similarly has an optical pump port $106_2$ and an optical signal port $108_2$. In some embodiments, optical coupler $110_2$ can be a nominal copy of optical coupler $110_1$.

In an example embodiment, an optical coupler 110 can be implemented using a dichroic mirror 112 that is substantially transparent to the pump light and is highly reflective for the signal light. In operation, dichroic mirror 112 of optical coupler $110_1$ passes through the pump light applied to optical pump port $106_1$, thereby coupling the pump light into optical gain medium 120. Dichroic mirror 112 of optical coupler 110$_2$ similarly passes through the residual pump light received from optical gain medium 120, thereby coupling the residual pump light out of optical amplifier 100 through optical pump port 106$_2$. The pump light is partially depleted in optical gain medium 120, e.g., due to the transfer of optical power therefrom to the optical signal that is being amplified in optical amplifier 100. This depletion can be quantified using a coefficient α (<1) that provides a measure of the unused portion of the pump power that passes through amplifier 100, from optical pump port 106$_1$ to optical pump port 106$_2$. For example, if the pump power applied to optical pump port 106$_1$ is P, then the unused pump power that exits optical amplifier 100 through optical pump port 106$_2$ is αP, as indicated in FIG. 1.

In different embodiments, the optical signal to be amplified in optical amplifier 100 may be coupled into optical gain medium 120 in the same direction as the pump light for co-directional pumping or in the opposite direction for contra-directional pumping. For example, for co-directional pumping, the optical signal to be amplified can be applied to optical signal port 108$_1$, and the corresponding amplified optical signal exits optical amplifier 100 through optical signal port 108$_2$. For contra-directional pumping, the optical signal to be amplified can be applied to optical signal port 108$_2$, and the corresponding amplified optical signal exits optical amplifier 100 through optical signal port 108$_1$. In both cases, dichroic mirrors 112 of optical couplers 110$_1$ and 110$_2$ operate to appropriately direct the optical signals between optical signal ports 108$_1$ and 108$_2$, through optical gain medium 120.

Figure 2:
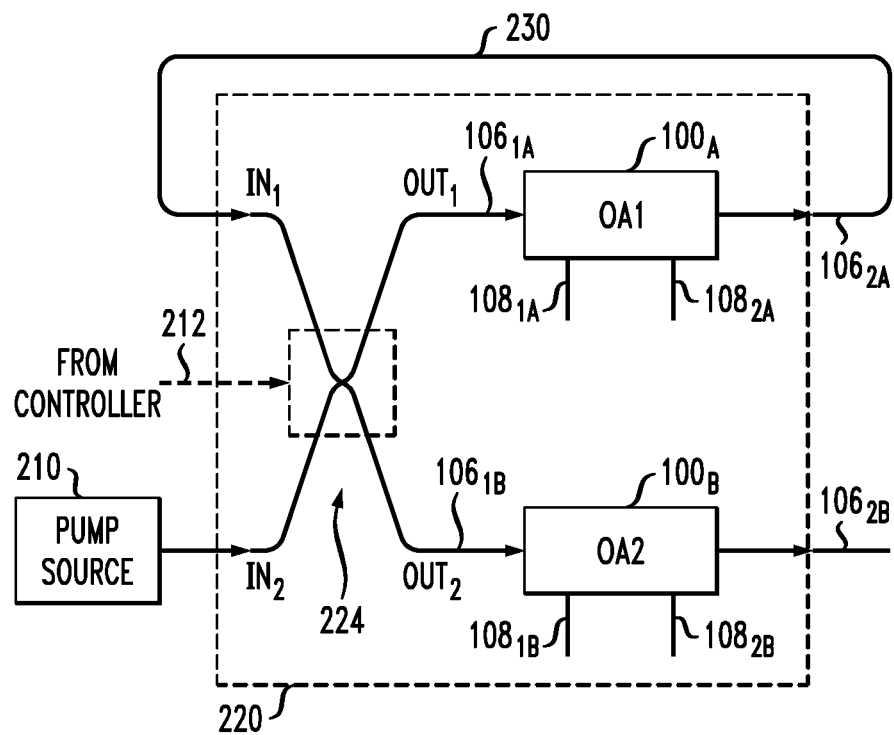
FIG. 2 shows a block diagram of two arrayed optical amplifiers according to an embodiment.

FIG. 2 shows a block diagram of an optical amplifier 200 according to an embodiment. For illustration purposes and without undue limitation, amplifier 200 is described below in reference to an embodiment in which amplifier 200 includes two arrayed amplifiers 100, which are labeled in FIG. 2 as 100$_A$ and 100$_B$, respectively. Optical amplifiers 100$_A$ and 100$_B$ are interconnected in amplifier 200 to recycle at least some of the unused pump energy, but otherwise can be configured to independently amplify two different respective optical signals. The four ports of optical amplifier 100$_A$ are labeled in FIG. 2 using the same labels as in FIG. 1, but with an additional subscript letter "A" appended thereto. The four ports of optical amplifier 100$_B$ are similarly labeled in FIG. 2 using an additional subscript letter "B." From the provided description, a person of ordinary skill in the art will understand how to make and use alternative embodiments of amplifier 200 by similarly arraying other suitable optical amplifiers instead of optical amplifiers 100$_A$ and 100$_B$.

Amplifier 200 can also include an optical pump source 210. In various embodiments, optical pump source 210 may include one or more of: (i) one or more lasers; (ii) a frequency-comb source; and (iii) a continuous broadband light source.

Optical amplifiers 100$_A$ and 100$_B$ are parts of an amplifier array 220 in which these optical amplifiers are connected to optical pump source 210 and to one another using a 2×2 optical coupler 224. More specifically, the two input ports (labeled IN1, IN2) and the two output ports (labeled OUT1, OUT2) of the 2×2 optical coupler 224 are connected as follows. A feedback path (e.g., optical fiber or waveguide) 230 connects optical pump port 106$_{2A}$ of optical amplifier 100$_A$ to input port IN1. Input port IN2 is connected to receive the pump light generated by optical pump source 210. Output port OUT1 is connected to feed the pump light to optical pump port 106$_{1A}$ of optical amplifier 100$_A$. Output port OUT2 is connected to feed the pump light to optical pump port 106$_{1B}$ of optical amplifier 100$_B$.

In some embodiments, optical coupler 224 can be tunable to change the ratio of optical-power transfer from an input port to the output ports OUT1 and OUT2 in response to an appropriate control signal 212 received from an external electronic controller. More specifically, when optical power P is applied to input port IN1, the portions of the optical power transferred to output ports OUT1 and OUT2 may be P$_1$ and P$_2$, respectively, with the ratio P$_1$/P$_2$ being changeable, for example, in the range between approximately 0.1 and 10. Due to the insertion loss of optical coupler 224, the sum (P$_1$+P$_2$) may be smaller than P. A person of ordinary skill in the art will understand, that such tunable optical coupler 224 may also exhibit similar power-transfer characteristics for power transfer from input port IN2 to output ports OUT1 and OUT2. When P$_1$/P$_2$=1, both optical amplifiers 100$_A$ and 100$_B$ of amplifier array 220 receive approximately equal pump power at optical pump ports 106$_{1A}$ and 106$_{1B}$, respectively.

Feedback path 230 helps to improve utilization of the pump power in amplifier 200 by coupling back into amplifier array 220 the unused portion of the pump power that exits optical amplifier 100$_A$ through optical pump port 106$_{2A}$. As a result, amplifier 200 may advantageously exhibit better pump-power utilization characteristics than two separately pumped amplifiers 100. For example, to achieve a certain optical gain for the optical signals applied to the corresponding signal ports 108, each of separately pumped optical amplifiers 100 (FIG. 1) may need the pump power P to be applied to its optical pump port 106$_1$, for the total pump power 2P for the two amplifiers. For comparison, to achieve the same optical gain for the optical signals applied to the corresponding signal ports 108 of optical amplifiers 100$_A$ and 100$_B$ in amplifier 200 (FIG. 2), optical pump source 210 only needs to apply to input port IN2 the pump power that is approximately (2−α) P. Therefore, the ratio (η) of the pump-power utilization factor corresponding to two separately pumped optical amplifiers 100 and the pump-power utilization factor corresponding to amplifier 200 can be estimated as follows:

$$\eta=2/(2-\alpha)>1 \tag{1}$$

In an example embodiment in which α=0.5, Eq. (1) gives an estimate of the ratio η as being approximately 1.33. A person of ordinary skill in the art will appreciate that this value of η represents a 33% improvement in the pump-power utilization for amplifier 200 compared to that of two separately pumped optical amplifiers 100.

Figure 3:
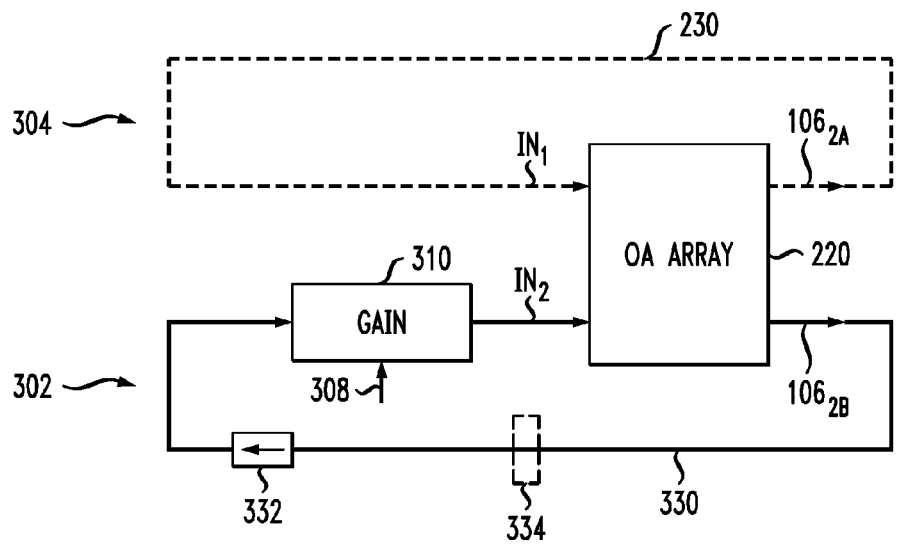
FIG. 3 shows a block diagram of two arrayed optical amplifiers according to another embodiment.

FIG. 3 shows a block diagram of an optical amplifier 300 according to another embodiment. Similar to amplifier 200 (FIG. 2), amplifier 300 includes amplifier array 220. For better clarity of depiction, the four optical signal ports 108 of amplifier array 220 and control signal 212 are not explicitly shown in FIG. 3 (see FIG. 2). The presence of feedback path 230 in amplifier 300 is optional, which is indicated in FIG. 3 using the dashed line that depicts feedback path 230 therein. Instead of or in addition to feedback path 230, amplifier 300 has a feedback path (e.g., optical fiber or waveguide) 330 that connects optical pump port 106$_{2B}$ of amplifier array 220 and a gain element 310, as indicated in FIG. 3. Gain element 310 is further connected to input port IN2 of amplifier array 220.

Gain element 310 is different from optical gain medium 120 (FIG. 1) in that gain element 310 operates to provide optical gain for pump light, whereas optical gain medium 120 operates to provide optical gain for signal light. In an example embodiment, gain element 310 provides sufficient optical gain for the pump light to: (i) offset optical losses, such as the above-mentioned pump-light depletion in optical gain media 120 of amplifier array 220, and (ii) cause amplifier 300 to also function as a ring laser that regenerates the used-up pump light. In various embodiments, gain element 310 can be implemented using one or more of the following: (i) an electrically pumped solid-state (e.g., semiconductor) optical amplifier; (ii) an optically pumped optical amplifier; and (iii) an optically pumped doped-fiber amplifier. A corresponding (e.g., electrical or optical) pump source for gain element 310 is represented in FIG. 3 by an arrow 308.

In an example embodiment, the ring laser of amplifier 300 comprises an optical loop 302 that includes gain element 310, a portion of the 2×2 optical coupler 224 of amplifier array 220 (see FIG. 2), optical amplifier $100_B$ of amplifier array 220 (see FIG. 2), and feedback path 330. Feedback path 330 may include one or both of an optical isolator 332 and an optical filter 334. Optical isolator 332 operates to suppress counterclockwise light circulation through optical loop 302. Optical filter 334 operates to spectrally limit the optical gain spectrum of the ring laser to a desired spectral band. In some embodiments, optical filter 334 can be an integral part of gain element 310.

In embodiments in which feedback path 230 is present in amplifier 300, the ring laser of amplifier 300 further comprises an optical loop 304 that includes another portion of the 2×2 optical coupler 224 of amplifier array 220, optical amplifier $100_A$ of amplifier array 220, and feedback path 230 (also see FIG. 2). Similar to feedback path 330, feedback path 230 in amplifier 300 may include one or both of an additional optical isolator and an additional optical filter (not explicitly shown in FIG. 3) that are functionally similar to optical isolator 332 and optical filter 334, respectively. Optical loops 302 and 304 are optically coupled to one another through the 2×2 optical coupler 224 of amplifier array 220 (also see FIG. 2).

Feedback paths 230 and 330 operate to improve utilization of the pump power in amplifier 300 by coupling back into the amplifier the unused portions of the pump power that exit amplifier array 220 through optical pump ports $106_{2A}$ and $106_{2B}$, respectively.

Figure 4:
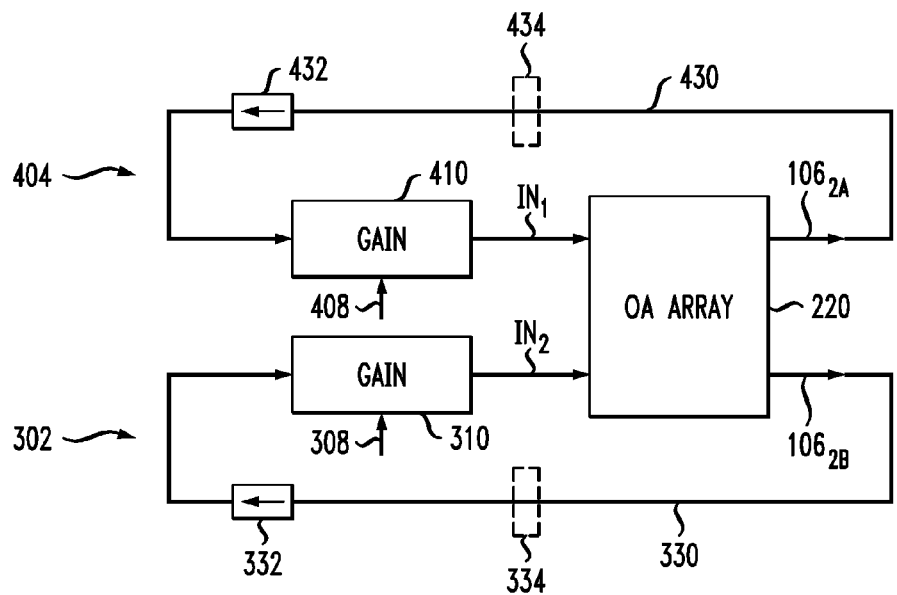
FIG. 4 shows a block diagram of two arrayed optical amplifiers according to yet another embodiment.

FIG. 4 shows a block diagram of an optical amplifier 400 according to yet another embodiment. Amplifier 400 is a modification of amplifier 300 (FIG. 3) in which optical loop 304 is replaced by an optical loop 404. In an example embodiment, optical loop 404 comprises a gain element 410, a portion of the 2×2 optical coupler 224 of amplifier array 220 (see FIG. 2), optical amplifier $100_A$ of amplifier array 220 (see FIG. 2), and a feedback path 430. Feedback path 430 connects optical pump port $106_{2A}$ of amplifier array 220 and gain element 410 and may include one or both of an optical isolator 432 and an optical filter 434.

In some embodiments of amplifier 400, gain element 410, optical isolator 432, and optical filter 434 can be nominal copies of gain element 310, optical isolator 332, and optical filter 334, respectively. In such embodiments, optical loops 302 and 404 form a ring laser that generates pump light in the spectral band corresponding to the (common) passband of optical filters 334 and 434.

In some other embodiments of amplifier 400, optical filter 434 can have a spectral passband that is different from (e.g., does not overlap with or is spectrally shifted with respect to) the spectral passband of optical filter 334. Gain element 410 may also be different from gain element 310, e.g., by being capable of generating light having wavelengths within the spectral passband of optical filter 434 in response to being pumped by a corresponding electrical or optical pump source 408. In such embodiments of amplifier 400, optical loops 302 and 404 of the corresponding ring laser operate to generate pump light of different respective wavelengths. Such embodiments may be useful for amplification of optical wavelength-division-multiplexed (WDM) signals in amplifier array 220, e.g., because more-efficient amplification of different WDM components in optical amplifier 100 (FIG. 1) may occur in response to pump light of different respective wavelengths.

Figure 5A:
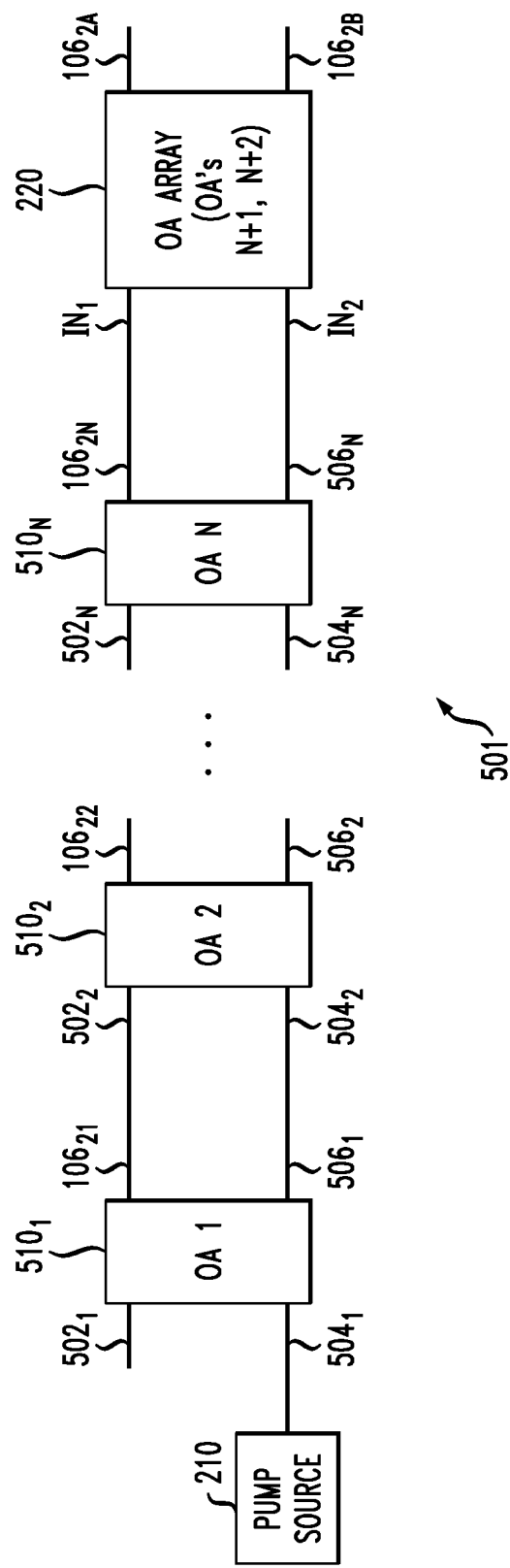
FIGS. 5A-5B show block diagrams of arrayed optical amplifiers according to an embodiment.
Figure 5B:
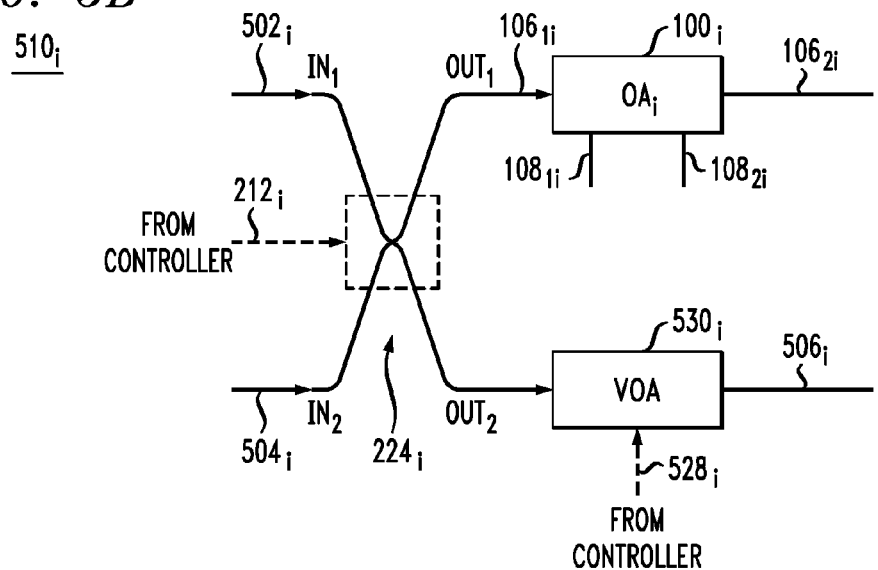

FIGS. 5A-5B show block diagrams of an optical amplifier 500 having (N+2) arrayed constituent amplifiers according to an embodiment, where N is a positive integer. More specifically, FIG. 5A shows an overall block diagram of amplifier 500. FIG. 5B shows a block diagram of a constituent amplifier $510_i$, where the index "i" can be 1, ..., N. Two additional constituent amplifiers are parts of the amplifier array 220 that is connected to amplifiers $510_i$ as indicated in FIG. 5A (also see FIG. 2). The latter two amplifiers are labeled in FIG. 5A as the (N+1)-th OA and (N+2)-th OA, respectively. The amplifier array that includes the N arrayed amplifiers 510; and the amplifier array 220 is labeled in FIG. 5A as 501. In some alternative embodiments, the amplifier array 220 can be replaced by one or two additional (e.g., serially connected) amplifiers 510. In some other alternative embodiments, the amplifier array 220 is optional and can be removed.

For illustration purposes and without undue limitation, FIG. 5A shows an embodiment corresponding to N≥3. A person of ordinary skill in the art will understand that embodiments corresponding to N=1 and N=2 are also possible. In general, the amplifier architecture illustrated by FIGS. 5A-5B can be used to implement an optical amplifier having three or more arrayed amplifiers, each of which can be used to independently amplify a respective different optical signal.

Referring to FIG. 5B, amplifier $510_i$ comprises a 2×2 optical coupler $224_i$, an optical amplifier $100_i$, and an optional variable optical attenuator (VOA) $530_i$. The 2×2 optical coupler $224_i$ is a nominal copy of the 2×2 optical coupler 224 already described above in reference to FIG. 2. The optical amplifier $100_i$ is a nominal copy of optical amplifier 100 already described above in reference to FIG. 1. The four ports of optical amplifier $100_i$ are labeled in FIG. 5B using the same labels as in FIG. 1, but with an additional subscript letter "i" appended thereto. Variable optical attenuator $530_i$ is a conventional variable optical attenuator that can change the attenuation imposed on the pump light passing therethrough in response to an appropriate control signal $528_i$ received from an external electronic controller. In various embodiments, control signals $212_i$ and $528_i$ can be generated by the same electronic controller or by different respective electronic controllers. The control signal can also be applied mechanically and/or manually, e.g., during a manual factory calibration process. Fixed optical couplers and/or attenuators can alternatively be used, e.g., if no dynamic control of the couplers/attenuators is desired for a particular embodiment.

In some embodiments, variable optical attenuator $530_i$ can be replaced by an optical gain element that is similar to gain element 310 (FIG. 3) or 410 (FIG. 4).

Amplifier $510_i$ has four optical pump ports that are labeled $502_i$, $504_i$, $506_i$, and $106_{2i}$, respectively. Ports $502_i$ and $504_i$ are input ports. Ports $506_i$ and $106_{2i}$ are output ports. The four ports of the 2×2 optical coupler $224_i$ are connected as follows. Input port IN1 of the 2×2 optical coupler $224_i$ is connected to the optical pump port $502_i$. Input port IN2 of the 2×2 optical coupler $224_i$ is connected to the optical pump port $504_i$. Output port OUT1 of the 2×2 optical coupler $224_i$ is connected to optical pump port $106_{1i}$ of optical amplifier $100_i$. Output port OUT2 is connected to the optical pump port $506_i$ by way of the optional variable optical attenuator or gain element $530_i$.

In operation, the 2×2 optical coupler $224_i$ causes the pump power received by amplifier $510_i$ at input ports $502_i$ and $504_i$ to be divided into two portions. The first portion is applied to optically pump amplifier $100_i$ through optical pump port $106_{1i}$ thereof. The second portion bypasses amplifier $100_i$ and is directed to the optical pump port $506_i$ by way of the optional variable optical attenuator $530_i$. The first portion is partially depleted in optical amplifier $100_i$ e.g., due to the transfer of optical power therefrom to the optical signal that is being amplified in that optical amplifier. The corresponding residual pump power exits optical amplifier $100_i$ through optical pump port $106_{2i}$.

Referring back to FIG. 5A, amplifier array 501 has four optical pump ports that are labeled $502_1$, $504_1$, $106_{2A}$, and $106_{2B}$, respectively. Ports $502_1$ and $504_1$ are input ports. Ports $106_{2A}$ and $106_{2B}$, are output ports. In the embodiment shown in FIG. 5A, input port $504_1$ is connected to receive the pump power generated by an optical pump source 210, example embodiments of which have been described above in reference to FIG. 2. In various alternative embodiments, the optical pump ports $502_1$, $504_1$, $106_{2A}$, and $106_{2E}$ of amplifier array 501 can be connected to various external pump sources and/or each other, e.g., as described in more detail below in reference to FIGS. 6-9.

Output ports $506_1$ and $106_{21}$ of amplifier $510_1$ are connected to input ports $504_2$ and $502_2$, respectively, of amplifier $510_2$. Output ports $506_2$ and $106_{22}$ of amplifier $510_2$ are connected to the input ports of the next amplifier 510. Input ports $502_N$ and $504_N$ of amplifier $510_N$ are connected to the output ports of the preceding amplifier 510. Output ports $106_{2N}$ and $506_N$ of amplifier $510_N$ are connected to input ports IN1 and IN2, respectively, of the amplifier array 220 used in amplifier 500. For better clarity of depiction, the optical signal ports 108 and control signals 212 and 528 of the various constituent amplifiers in amplifier array 501 are not explicitly shown in FIG. 5A (see FIGS. 2 and 5B).

For each of the (N+2) optical amplifiers 100 used in optical amplifier 500 to receive approximately equal input pump power, an embodiment having the following example features can be used. None of variable optical attenuators $530_i$ is present in amplifiers $510_1$-$510_N$, or the attenuation is set to ~0 dB. The (N+2) optical couplers 224 used in amplifier array 501 are configured to have the coupling ratios in accordance with the following numerical pattern:
(1) ½, for optical coupler 224 used in amplifier array 220;
(2) ⅔, for optical coupler $224_N$ used in amplifier $510_N$;
(3) (N+2−j)/(N+3−j), for optical coupler $224_j$ used in amplifier $510_j$, where j=3, 4, . . . , N−1;
(4) N/(N+1), for optical coupler $224_2$ used in amplifier $510_2$; and
(5) (N+1)/(N+2), for optical coupler $224_1$ used in amplifier $510_1$.

If it is desired for at least some of the (N+2) optical amplifiers 100 used in optical amplifier 500 to receive different respective pump powers, then the optical couplers 224 and variable optical attenuators or gain elements 530 can be reconfigured accordingly, e.g., using the corresponding control signals 212 and 528, respectively. In some embodiments, optical couplers 224 and variable optical attenuators or gain elements 530 of amplifier array 501 can be used to dynamically adjust the optical gain of the various constituent amplifiers of optical amplifier 500, e.g., as deemed appropriate or necessary for the amplification of the respective optical signals applied thereto. A person of ordinary skill in the art will understand that optical amplifier 500 is advantageously capable of providing significant pump-power savings with respect to (N+2) separately pumped optical amplifiers 100.

Figure 6:
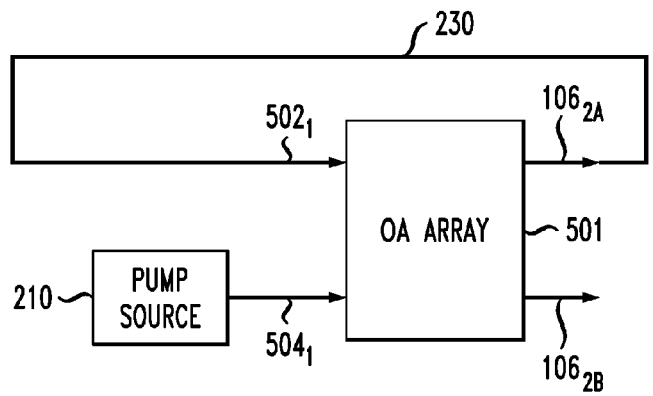
FIGS. 6-9 illustrate several alternative pumping schemes for the arrayed optical amplifiers shown in FIG. 5 according to respective alternative embodiments.

FIG. 6 shows a block diagram of an optical amplifier 600 according to an embodiment. Similar to optical amplifier 500 (FIG. 5A), optical amplifier 600 has amplifier array 501 and optical pump source 210. In addition, optical amplifier 600 has a feedback path 230 that connects optical pump ports $106_{2A}$ and $502_1$ of amplifier array 501 as indicated in FIG. 6. Feedback path 230 helps to improve utilization of the pump power in amplifier 600 by coupling back into amplifier array 501 the unused portion of the pump power that exits the amplifier array through optical pump port $106_{2A}$.

Figure 7:
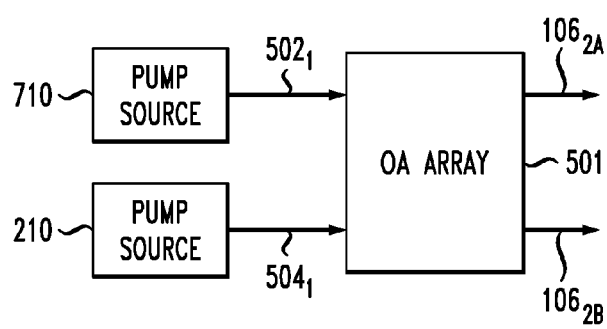

FIG. 7 shows a block diagram of an optical amplifier 700 according to an embodiment. Similar to optical amplifier 500 (FIG. 5A), optical amplifier 700 has amplifier array 501 and optical pump source 210. In addition, optical amplifier 700 has an optical pump source 710 connected to optical pump port $502_1$ of amplifier array 501 as indicated in FIG. 7. In an example embodiment, optical pump sources 210 and 710 can generate pump light of different respective wavelengths. Such an embodiment may be useful for amplification of optical WDM signals in amplifier array 501, e.g., because more-efficient amplification of different WDM components in individual optical amplifiers 100 of the amplifier array may occur in response to pump light of different respective wavelengths.

Figure 8:
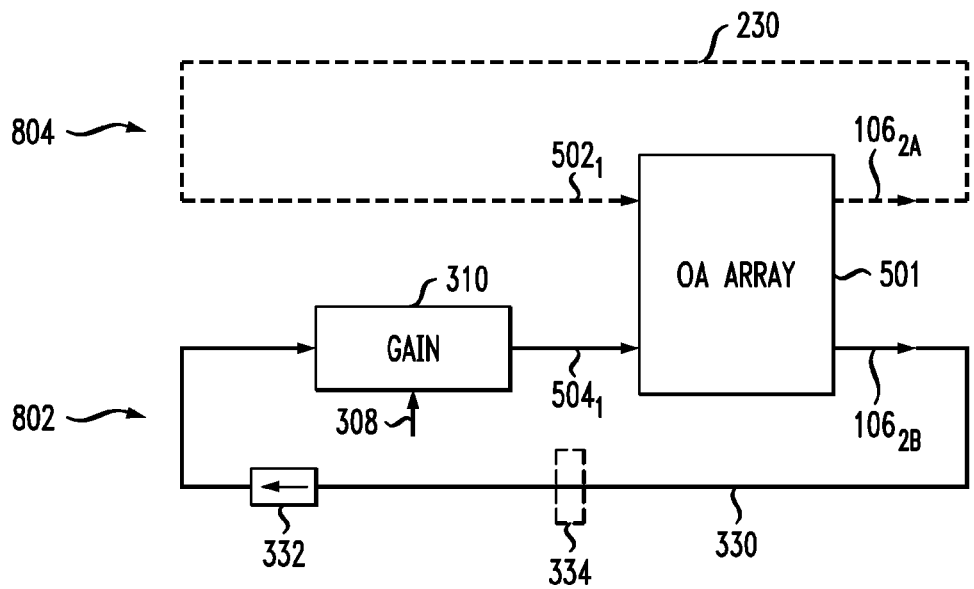

FIG. 8 shows a block diagram of an optical amplifier 800 according to an embodiment. Similar to optical amplifier 600 (FIG. 6), optical amplifier 800 includes amplifier array 501. However, the presence of a feedback path 230 in optical amplifier 800 is optional, which is indicated in FIG. 8 using the dashed line that depicts feedback path 230 therein. Optical amplifier 800 further differs from optical amplifier 600 (FIG. 6) in that optical pump source 210 is replaced by a feedback path 330 and a gain element 310 that are connected to amplifier array 501 as indicated in FIG. 8.

In an example embodiment, gain element 310 provides sufficient optical gain for the pump light to cause optical amplifier 800 to also function as a ring laser that regenerates the pump light. The ring laser of amplifier 800 comprises an optical loop 802 that includes gain element 310, a portion of amplifier array 501, and feedback path 330. Feedback path 330 may include one or both of an optical isolator 332 and an optical filter 334. Optical isolator 332 operates to suppress counterclockwise light circulation through optical loop 802. Optical filter 334 operates to spectrally limit the optical gain spectrum of the ring laser to a desired spectral band.

In embodiments in which feedback path 230 is present in optical amplifier 800, the ring laser of optical amplifier 800 further comprises an optical loop 804 that includes another portion of amplifier array 501 and feedback path 230. Optical loops 802 and 804 are optically coupled to one another through the 2×2 optical couplers 224 of amplifier array 501 (also see FIGS. 2 and 5A-5B). Feedback paths 230 and 330 operate to improve utilization of the pump power in optical amplifier 800 by coupling back into amplifier array 501 the unused portions of the pump power that exit the amplifier array through optical pump ports $106_{2A}$ and $106_{2B}$, respectively.

Figure 9:
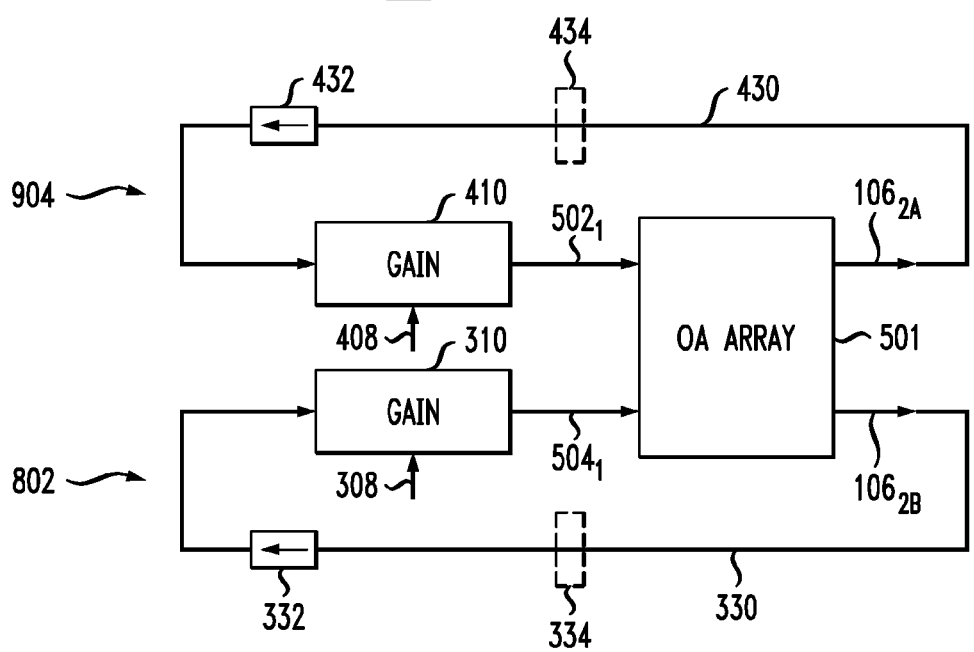

FIG. 9 shows a block diagram of an optical amplifier 900 according to an embodiment. Optical amplifier 900 is a modification of optical amplifier 800 (FIG. 8) in which optical loop 804 is replaced by an optical loop 904. In an example embodiment, optical loop 904 comprises a gain element 410, a portion of amplifier array 501, and a feedback path 430. Feedback path 430 connects optical pump port 106$_{2,4}$ of amplifier array 501 and gain element 410 and may include one or both of an optical isolator 432 and an optical filter 434.

In some embodiments of optical amplifier 900, gain element 410, optical isolator 432, and optical filter 434 can be nominal copies of gain element 310, optical isolator 332, and optical filter 334, respectively. In such embodiments, optical loops 802 and 904 form a ring laser that generates pump light in the spectral band corresponding to the (common) passband of optical filters 334 and 434.

In some other embodiments of optical amplifier 900, optical filter 434 can have a spectral passband that is different from the spectral passband of optical filter 334. Gain element 410 may also be different from gain element 310, e.g., by being capable of generating light having wavelengths within the spectral passband of optical filter 434. In such embodiments of optical amplifier 900, optical loops 802 and 904 of the corresponding ring laser operate to generate pump light of different respective wavelengths. Such embodiments may be useful for amplification of optical WDM signals in amplifier array 501, e.g., because more-efficient amplification of different WDM components in individual optical amplifiers 100 of the amplifier array may occur in response to pump light of different respective wavelengths.

According to an example embodiment disclosed above in reference to FIGS. 1-9, provided is an apparatus comprising: a plurality of optical amplifiers (e.g., 100$_i$, 100$_A$, FIGS. 1, 2, 5), each configured to: amplify a respective optical signal (e.g., received through 108$_1$ or 108$_2$, FIG. 1) in response to receiving pump light at a respective input pump port thereof (e.g., 106$_1$, FIG. 1); and output a respective unused portion of the pump light through a respective output pump port thereof (e.g., 106$_2$, FIG. 1); and a set of one or more optical couplers (e.g., 224$_k$, where k=2, . . . , N, and/or 224 in 220, FIG. 5) that connect the plurality of optical amplifiers in a series. Each optical coupler of the set is connected between a respective preceding optical amplifier of the series (e.g., 100$_{k-1}$, FIG. 5) and a respective next optical amplifier of the series (e.g., 100$_k$ or 100$_A$ in 220, FIG. 5) and is configured to: split the respective unused portion of the pump light that exits the respective output pump port of the preceding optical amplifier into a respective first light beam (e.g., directed through OUT1, FIG. 2 or 5B) and a respective second light beam (e.g., directed through OUT2, FIG. 2 or 5B); apply the respective first light beam to the respective input pump port of the respective next optical amplifier; and direct the respective second light beam to bypass the respective next optical amplifier.

As used herein, the term "light beam" should be construed to cover both free-space light beams and guided light beams that propagate through an optical fiber or waveguide.

In some embodiments of the above apparatus, the set comprises at least two optical couplers.

In some embodiments of any of the above apparatus, the set comprises: a first optical coupler (e.g., 224$_k$, FIG. 5) having a first coupling ratio; and a second optical coupler (e.g., 224 in 220, FIG. 5) having a different second coupling ratio.

In some embodiments of any of the above apparatus, the optical couplers of the set have respective coupling ratios that cause the plurality of optical amplifiers to receive approximately (e.g., within ±10%) equal pump power at the respective input pump ports thereof.

In some embodiments of any of the above apparatus, the set comprises: a first optical coupler having first and second output ports (e.g., OUT1, OUT2, FIG. 5B), the first output port configured to output the respective first light beam, the second output port configured to output the respective second light beam; and a second optical coupler having first and second input ports (e.g., IN1, IN2, FIG. 5B, or IN1, IN2 in 220, FIG. 5A), the first input port connected to the first output port of the first optical coupler by way of one (e.g., 100$_i$, FIG. 5) of the plurality of optical amplifiers, and the second input port connected to the second output port of the first optical coupler.

In some embodiments of any of the above apparatus, the apparatus further comprises a variable optical attenuator (e.g., 530$_i$, FIG. 5B) connected between the second output port of the first optical coupler and the second input port of the second optical coupler.

In some embodiments of any of the above apparatus, the apparatus further comprises an optical gain element (e.g., in place of 530$_i$, FIG. 5B) connected between the second output port of the first optical coupler and the second input port of the second optical coupler.

In some embodiments of any of the above apparatus, the second optical coupler has first and second output ports (e.g., OUT1, OUT2, FIG. 5B, or OUT1, OUT2 in 220, FIG. 5A).

In some embodiments of any of the above apparatus, the first output port of the second optical coupler is connected to the respective input pump port of another one (e.g., 100$_A$ in 220, FIG. 5A) of the plurality of optical amplifiers.

In some embodiments of any of the above apparatus, the second output port of the second optical coupler is connected to an input pump port of an additional optical amplifier (e.g., 100$_B$ in 220, FIG. 5A).

In some embodiments of any of the above apparatus, at least one optical coupler of the set is tunable to change a coupling ratio thereof in response to a control signal (e.g., 212$_i$, FIG. 5B) received from an electronic controller.

In some embodiments of any of the above apparatus, the apparatus further comprises a feedback path (e.g., 230, FIG. 6; 430, FIG. 9) that connects the respective output pump port of a last optical amplifier (e.g., 100$_A$ in 501, FIG. 6 or 9) of the series and the respective input pump port of a first optical amplifier (e.g., 100$_1$ in 501, FIG. 6 or 9) of the series.

In some embodiments of any of the above apparatus, the feedback path includes an optical gain element (e.g., 410, FIG. 9) capable of generating pump light.

In some embodiments of any of the above apparatus, the apparatus further comprises a ring laser (e.g., having 904, FIG. 9) that includes the feedback path.

In some embodiments of any of the above apparatus, the apparatus further comprises a first pump source (e.g., 210, FIG. 6 or 7) configured to feed pump light into the respective input pump port of a first optical amplifier (e.g., 100$_1$ in 501, FIG. 6 or 9) of the series.

In some embodiments of any of the above apparatus, the apparatus further comprises an additional optical coupler (e.g., 224$_1$, FIG. 5) having a first input port (e.g., IN2, FIG. 5B), a second input port (e.g., IN1, FIG. 5B), and an output port (e.g., OUT1, FIG. 5B), wherein: the first input port of the additional optical coupler is connected to the first pump source; and the output port of the additional optical coupler is connected to the respective input pump port of the first optical amplifier of the series.

In some embodiments of any of the above apparatus, the apparatus further comprises a second pump source (e.g., 710, FIG. 7) connected to the second input port of the additional optical coupler to feed pump light into the output port of the additional optical coupler.

In some embodiments of any of the above apparatus, the second pump source is configured to generate pump light that has a different wavelength than the pump light generated by the first pump source.

In some embodiments of any of the above apparatus, the apparatus further comprises a feedback path (e.g., 230, FIG. 6) that connects the respective output pump port of a last optical amplifier (e.g., $100_A$ in 501, FIG. 6 or 9) of the series and the second input port of the additional optical coupler.

According to another example embodiment disclosed above in reference to FIGS. 1-9, provided is an apparatus comprising: an optical coupler (e.g., 224, FIG. 2) having first and second input ports (e.g., IN1, IN2, FIG. 2) and first and second output ports (e.g., OUT1, OUT2, FIG. 2); a first optical amplifier (e.g., $100_A$, FIG. 2) having an input pump port (e.g., $106_{1A}$, FIG. 2) and an output pump port (e.g., $106_{2A}$, FIG. 2), the input pump port of the first optical amplifier connected to receive pump light from the first output port of the optical coupler, and the output pump port of the first optical amplifier connected to apply an unused portion of the pump light to the first input port of the optical coupler; and a second optical amplifier (e.g., $100_B$, FIG. 2) having an input pump port (e.g., $106_{1B}$, FIG. 2) connected to receive pump light from the second output port of the optical coupler.

In some embodiments of the above apparatus, the apparatus further comprises a pump source (e.g., 210, FIG. 2) configured to apply generated pump light to the second input port of the optical coupler.

In some embodiments of any of the above apparatus, the first optical amplifier is configured to amplify a first optical signal (e.g., received through $108_{1A}$ or $108_{2A}$, FIG. 2) in response to receiving pump light at the input pump port thereof.

In some embodiments of any of the above apparatus, the second optical amplifier is configured to amplify a different second optical signal (e.g., received through $108_{1B}$ or $108_{2B}$, FIG. 2) in response to receiving pump light at the input pump port thereof.

While this invention has been described with reference to illustrative embodiments, this description is not intended to be construed in a limiting sense.

Contra-directional pumping is not limited to Raman optical amplifiers and can be used with other amplifier types if deemed beneficial.

Co-directional pumping is not limited to EDFAs and can be used with other amplifier types if deemed beneficial.

Various suitable rare-earth doped fiber amplifiers can be used to implement optical amplifiers 100 in various alternative embodiments.

Various modifications of the described embodiments, as well as other embodiments of the invention, which are apparent to persons skilled in the art to which the inventions pertain are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of the inventions may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The various present inventions may be embodied in other specific apparatus and/or methods. The described embodiments are to be considered in all respects as only illustrative and not restrictive. In particular, the scope of the inventions is indicated by the appended claims rather than by the description and figures herein. All changes that come within the meaning and range of equivalency of the claims are to be embraced within their scope.

The functions of the various elements shown in the figures, including any functional blocks labeled as "processors" or "controllers," may be provided through the use of dedicated hardware as well as hardware capable of executing software in association with appropriate software. Moreover, explicit use of the term "computer," "processor," or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The description and drawings merely illustrate the principles of the inventions. It will thus be appreciated that those of ordinary skill in the art will be able to devise various arrangements that, although not explicitly described or shown herein, embody the principles of the inventions and are included within its spirit and scope. Furthermore, all examples recited herein are principally intended expressly to be only for pedagogical purposes to aid the reader in understanding the principles of the inventions and the concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof.

What is claimed is:

1. An apparatus comprising:
   a plurality of optical amplifiers, each configured to:
   amplify a respective optical signal in response to receiving pump light at a respective input pump port thereof; and
   output a respective unused portion of the pump light through a respective output pump port thereof; and
   a set of one or more optical couplers that connect the plurality of optical amplifiers in a series; and
   wherein each optical coupler of the set is connected between a respective preceding optical amplifier of the series and a respective next optical amplifier of the series and is configured to:
   split the respective unused portion of the pump light that exits the respective output pump port of the preceding optical amplifier into a respective first light beam and a respective second light beam;
   apply the respective first light beam to the respective input pump port of the respective next optical amplifier; and
   direct the respective second light beam to bypass the respective next optical amplifier.

2. The apparatus of claim 1, wherein the set comprises at least two optical couplers.

3. The apparatus of claim 2, wherein the set comprises:
   a first optical coupler having a first coupling ratio; and
   a second optical coupler having a different second coupling ratio.

4. The apparatus of claim 2, wherein the optical couplers of the set have respective coupling ratios that cause the plurality of optical amplifiers to receive approximately equal pump power at the respective input pump ports thereof.

5. The apparatus of claim 2, wherein the set comprises:
   a first optical coupler having first and second output ports, the first output port configured to output the respective first light beam, the second output port configured to output the respective second light beam; and
   a second optical coupler having first and second input ports, the first input port connected to the first output port of the first optical coupler by way of one of the plurality of optical amplifiers, and the second input port connected to the second output port of the first optical coupler.

6. The apparatus of claim 5, further comprising a variable optical attenuator connected between the second output port of the first optical coupler and the second input port of the second optical coupler.

7. The apparatus of claim 5, further comprising an optical gain element connected between the second output port of the first optical coupler and the second input port of the second optical coupler.

8. The apparatus of claim 5,
   wherein the second optical coupler has first and second output ports; and
   wherein the first output port of the second optical coupler is connected to the respective input pump port of another one of the plurality of optical amplifiers.

9. The apparatus of claim 8, wherein the second output port of the second optical coupler is connected to an input pump port of an additional optical amplifier.

10. The apparatus of claim 1, wherein at least one optical coupler of the set is tunable to change a coupling ratio thereof in response to a control signal received from an electronic controller.

11. The apparatus of claim 1, further comprising a feedback path that connects the respective output pump port of a last optical amplifier of the series and the respective input pump port of a first optical amplifier of the series.

12. The apparatus of claim 11, wherein the feedback path includes an optical gain element capable of generating pump light.

13. The apparatus of claim 12, further comprising a ring laser that includes the feedback path.

14. The apparatus of claim 1, further comprising a first pump source configured to feed pump light into the respective input pump port of a first optical amplifier of the series.

15. The apparatus of claim 14, further comprising an additional optical coupler having a first input port, a second input port, and an output port, wherein:
   the first input port of the additional optical coupler is connected to the first pump source; and
   the output port of the additional optical coupler is connected to the respective input pump port of the first optical amplifier of the series.

16. The apparatus of claim 15, further comprising a second pump source connected to the second input port of the additional optical coupler to feed pump light into the output port of the additional optical coupler; and
   wherein the second pump source is configured to generate pump light that has a different wavelength than the pump light generated by the first pump source.

17. The apparatus of claim 15, further comprising a feedback path that connects the respective output pump port of a last optical amplifier of the series and the second input port of the additional optical coupler.

18. An apparatus comprising:
   an optical coupler having first and second input ports and first and second output ports connected to receive light from the first and second input ports;
   a first optical amplifier having an input pump port and an output pump port, the input pump port of the first optical amplifier connected to receive pump light from the first output port of the optical coupler, and the output pump port of the first optical amplifier connected to apply an unused portion of the pump light to the first input port of the optical coupler; and
   a second optical amplifier having an input pump port connected to receive pump light from the second output port of the optical coupler;
   wherein the first optical amplifier is configured to amplify a first optical signal in response to receiving pump light at the input pump port thereof; and
   wherein the second optical amplifier is configured to amplify a different second optical signal in response to receiving pump light at the input pump port thereof.

19. The apparatus of claim 18, further comprising a pump source configured to apply generated pump light to the second input port of the optical coupler.

* * * * *